(12) United States Patent
Hirai et al.

(10) Patent No.: US 11,644,203 B2
(45) Date of Patent: May 9, 2023

(54) VENTILATION SYSTEM

(71) Applicant: DAIKIN INDUSTRIES, LTD., Osaka (JP)

(72) Inventors: Kousuke Hirai, Osaka (JP); Gakuto Sakai, Osaka (JP); Kenta Kobayashi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 569 days.

(21) Appl. No.: 16/479,711

(22) PCT Filed: Nov. 15, 2017

(86) PCT No.: PCT/JP2017/041150
§ 371 (c)(1),
(2) Date: Jul. 22, 2019

(87) PCT Pub. No.: WO2018/139015
PCT Pub. Date: Aug. 2, 2018

(65) Prior Publication Data
US 2021/0404679 A1 Dec. 30, 2021

(30) Foreign Application Priority Data

Jan. 26, 2017 (JP) .............................. JP2017-011994

(51) Int. Cl.
*F24F 11/00* (2018.01)
*F24F 11/62* (2018.01)
(Continued)

(52) U.S. Cl.
CPC .......... *F24F 11/0001* (2013.01); *F24F 11/46* (2018.01); *F24F 11/62* (2018.01); *F24F 11/77* (2018.01); *F24F 2110/70* (2018.01)

(58) Field of Classification Search
CPC ........ F24F 11/0001; F24F 11/46; F24F 11/62; F24F 11/77; F24F 2100/70
(Continued)

(56) References Cited

U.S. PATENT DOCUMENTS 5,520,328 A * 5/1996 Bujak, Jr. ................ F24F 11/30
236/44 A
2008/0110187 A1* 5/2008 Han ........................ F24F 11/30
62/159

(Continued)

FOREIGN PATENT DOCUMENTS

CN 103370612 A 10/2013
JP 4-116329 A 4/1992
(Continued)

OTHER PUBLICATIONS

International Search Report, issued in PCT/JP2017/041150, PCT/ISA/210, dated Jan. 16, 2018.
(Continued)

*Primary Examiner* — Allen R. B. Schult
(74) *Attorney, Agent, or Firm* — Birch, Stewart, Kolasch & Birch, LLP

(57) ABSTRACT

In a system where a plurality of ventilation devices (10) are provided in one room, a control device (5) is provided to control, for the ventilation devices (10) operating, the number of the ventilation devices so that the detected values of the carbon dioxide sensors (13) are lower than the reference value.

14 Claims, 3 Drawing Sheets

(51) Int. Cl.
*F24F 11/77* (2018.01)
*F24F 11/46* (2018.01)
*F24F 110/70* (2018.01)

(58) Field of Classification Search
USPC ........................................................ 454/229
See application file for complete search history.

(56) References Cited

U.S. PATENT DOCUMENTS

2013/0295835 A1    11/2013  Fleischer et al.
2014/0165636 A1*    6/2014  Zhang ..................... F24F 11/30
                                                       454/258
2015/0300670 A1*   10/2015  Sakamoto ............ F24F 11/0001
                                                       165/244

FOREIGN PATENT DOCUMENTS

JP         2007-3160 A        1/2007
JP         2013-87969 A       5/2013
JP        2013-124788 A       6/2013
JP        2013-160447 A       8/2013
KR        2013141117 A     * 12/2013

OTHER PUBLICATIONS

Extended European Search Report, dated Oct. 1, 2020, for European Application No. 17893698.5.

\* cited by examiner

FIG.4

| $CO_2$ CONCENTRATION (ppm) | TARGET NUMBER OF VENTILATION DEVICES OPERATING | VOLUME OF AIR SET | |
|---|---|---|---|
| | | FOR UNITS HAVING SETTING OF CONSTANT VOLUME OF AIR = YES | FOR UNITS HAVING SETTING OF CONSTANT VOLUEME OF AIR = NO |
| EQUAL TO OR MORE THAN 1300 | TARGET NUMBER OF VENTILATION DEVICES OPERATING = ALL THE VENTILATION DEVICES AS TARGET OF $CO_2$ GANG CONTROL | VOLUME OF AIR SET = H TAP | SETTING OF VOLUME OF AIR IS NOT CHANGED |
| LESS THAN EQUAL TO OR MORE THAN 1200 | TARGET NUMBER OF VENTILATION DEVICES OPERATING = CURRENT NUMBER OF VENTILATION DEVICES OPERATING +1 | (VOLUME OF AIR SET ON SITE FOR EACH VENTILATION DEVICE IS USED) | |
| LESS THAN EQUAL TO OR MORE THAN 1000 (BASE CONCENTRATION) | TARGET NUMBER OF VENTILATION DEVICES OPERATING = CURRENT NUMBER OF VENTILATION DEVICES OPERATING | | |
| LESS THAN EQUAL TO OR MORE THAN 725 | TARGET NUMBER OF VENTILATION DEVICES OPERATING = HALF OF TARGET NUMBER OF VENTILATION DEVICES | | |
| LESS THAN 700 EQUAL TO OR MORE THAN 500 | | | |
| LESS THAN 400 | NUMBER OF VENTILATION DEVICES OPERATING = 1 | VOLUME OF AIR SET = L TAP | |

FIG.5

| CONTENTS OF SETTINGS | SETTING POSITIONS | | | | | | |
|---|---|---|---|---|---|---|---|
| | 01 | 02 | 03 | 04 | 05 | 06 | 07 |
| REFERENCE $CO_2$ CONCENTRATION SHIFT (ppm) | NO SHIFT | +100 | +200 | +400 | +600 | −100 | −200 |

VENTILATION SYSTEM

TECHNICAL FIELD

The present disclosure relates to a ventilation system including a plurality of ventilation devices, and more particularly to a ventilation system whose ventilation devices each including a $CO_2$ sensor detecting $CO_2$ concentration.

BACKGROUND ART

Conventionally, a ventilation system is known in which a plurality of ventilation devices are provided in one room (see, for example, Patent Document 1). In the ventilation system of Patent Document 1, a $CO_2$ detection unit detecting $CO_2$ concentration in the above room is provided in the room which is a target space. The above ventilation system is configured to control volumes of ventilation air of all the ventilation devices based on the $CO_2$ concentration detected by the $CO_2$ detection unit. Through this control, the volumes of ventilation air of all the ventilation devices are controlled so as to be identical to each other. In this way, the $CO_2$ concentration in the room is kept under the reference value, achieving low energy consumption (see paragraph 0018 of Patent Document 1).

Further, Patent Document 2 discloses an air-conditioning system. The air-conditioning system causes an indoor unit to treat air passing through a ventilation device (an outside air treatment system) having a total heat exchanger, and distributes the air to a plurality of rooms each provided with a $CO_2$ detection unit. In this air-conditioning system, the volume of air of the ventilation device is controlled in accordance with the maximum concentration value among the values detected in the $CO_2$ detection units respectively provided in the rooms, thereby achieving low energy consumption.

CITATION LIST

Patent Documents

Patent Document 1: Japanese Unexamined Patent Publication No. 2013-124788
Patent Document 2: Japanese Unexamined Patent Publication No. H04-116329

SUMMARY OF THE INVENTION

Technical Problem

The $CO_2$ concentration is non-uniform throughout a room. However, the system of Patent Document 1 is configured such that the $CO_2$ detection unit is provided at one position in the room. Hence, the system cannot control the non-uniform $CO_2$ concentration. Further, the system of Patent Document 1 operates to keep the $CO_2$ concentration under the reference value. However, at this time, all the ventilation devices are operated, resulting in insufficient achievement of low energy consumption.

The system of Patent Document 2 includes a plurality of rooms. In this system, no control dealing with the non-uniform $CO_2$ concentration throughout each of the plurality of rooms is performed. Further, air treated in the ventilation device and the indoor unit is distributed and supplied to each of the rooms. The ventilation device is always to be operated before the distribution of air treated. Also in this case, no sufficient low power consumption can be achieved.

In case where a plurality of $CO_2$ detection units are provided in one room as described in Patent Document 2 in the system with a plurality of ventilation devices in one room as described in Patent Document 1, one can come to such control as to change the number of the ventilation devices operating in accordance with the average value of $CO_2$ concentration. However, in the case where the number of the ventilation devices operating is controlled in accordance with the average value of $CO_2$ concentration, the number of the ventilation devices operating varies in accordance with the change of $CO_2$ concentration, resulting in hunting of the number of the ventilation devices operating, which may lead to unnecessary start-stop operations.

One of the objects of the present disclosure is to make it possible to achieve sufficient low power consumption at the time of the control of a system, in which a plurality of ventilation devices are provided in one room, in accordance with $CO_2$ concentration and, at the same time, to suppress unnecessary start-stop operations due to hunting of the number of the ventilation devices operating.

Solution to the Problem

A first aspect of the present disclosure is directed to a ventilation system including a plurality of ventilation devices (10) in a target space (2), and a carbon dioxide sensor (13) included in each of the ventilation devices (10).

The ventilation system includes a control device (5) configured to control, for all the ventilation devices (10) operating, the number of the ventilation devices operating such that detected values of the carbon dioxide sensors (13) are lower than a reference value, i.e., the maximum value among detected values of $CO_2$ sensors (13) is lower than the reference value. For the comparison of the detected values with the reference value, the maximum value among all the detected values may be calculated, and the maximum value is compared with the reference value, making a judgment. It is also possible to make a judgment through comparison of all the detected values with the reference value.

According to the first aspect, the number of the ventilation devices operating is controlled such that the detected values of $CO_2$ sensors (13) are lower than the reference value in all of ventilation devices (10) during operation, i.e., the maximum value among the detected values of the $CO_2$ sensors (13) is lower than the reference value. Therefore, in the case, for example, where the maximum value among the detected values of $CO_2$ sensors (13) exceeds the reference value during operation of two ventilation devices (10), the number of the ventilation devices operating is increased, while if the detected values of all the sensors is lower than the reference value, the operation continues with two ventilation devices operating.

In a second aspect of the first aspect according to the present disclosure, in a case of control of increase in the number of the ventilation devices (10), the control device (5) starts a ventilation device (10), among the ventilation devices (10), closest to a ventilation device (10), among the ventilation devices (10), with a maximum detected value of carbon dioxide.

According to the second aspect, the control device (5) is configured such that, in the case of control of increase in the number of the ventilation devices (10), the ventilation device (10) is started which is closest to the ventilation device (10) with a maximum detected value of CO2. That is, in the case of increase in the number of the ventilation devices (10), the ventilation device (10) which is closest to a region of the target space (2) where the CO2 concentration is high is started.

In a third aspect of the first or second aspect according to the present disclosure, the control device (5) increases the number of the ventilation devices (10) operating one by one in the case of control of increase the number of the ventilation devices operating and decreases the number of the ventilation devices (10) operating by half or almost by half in a case of control of decrease in the number of the ventilation devices operating.

According to the third aspect, in the case where the control is performed to increase the number of the above ventilation devices (10), the number is increased one by one, while in the case where the control is performed to decrease the number of the above ventilation devices (10), the number is decreased in a manner in which the number is decreased by half or almost by half.

In a fourth aspect of any one of the first to third aspects according to the present disclosure, in a case where one of the ventilation devices (10) is operated, the control device (5) sets a volume of air of a fan (12) provided in the one ventilation device (10) to minimum.

According to the fourth aspect, in the case where the situation remains with one ventilation device (10) operating, the $CO_2$ concentration is lower than the reference value even with one device operating. Accordingly, the volume of air of a fan (12) is controlled to be minimum.

In a fifth aspect of any one of the first to fourth aspects according to the present disclosure, in a case where the number of the ventilation devices (10) operating becomes maximum, the control device (5) sets volumes of air of all fans (12) provided in the respective ventilation devices (10) to maximum.

According to the fifth aspect, if the number of the ventilation devices (10) is maximum, the maximum value of the $CO_2$ concentration may have already exceeded the reference value. Therefore, the volumes of air of all the fans (12) provided in the respective ventilations devices (10) are maximized to increase the volume of air discharged, thereby reducing $CO_2$ concentration.

In a sixth aspect of any one of the first to fifth aspects according to the present disclosure, in a case where any one of the ventilation devices (10) stopped is started, the control device (5) is configured to start at first a ventilation device (10), among the ventilation devices (10), with a carbon dioxide sensor (13) showing the maximum detected values among all the carbon dioxide sensors (13).

According to this sixth aspect, after the ventilation devices (10) of this ventilation system have been stopped, the ventilation device (10) should be started at first, which includes the $CO_2$ sensor (13) with the maximum detected value of $CO_2$ concentration among all the $CO_2$ sensors (13). That is, in the case of start-up of the ventilation system, the ventilation starts with a region of the target space (2) where the $CO_2$ concentration is high.

In a seventh aspect of any one of the first to sixth aspects of the present disclosure, the control device (5) is configured such that a difference between an average value of the detected values of the carbon dioxide sensors (13) in a state where the number of the ventilation devices (10) operating is maximum and each of the detected values of the respective carbon dioxide sensors (13) is used as a correction factor for correction of the detected values, and that the number of the ventilation devices (10) operating is controlled based on the correction factor.

According to the seventh aspect, the controls of the above first to sixth aspects are carried out based on the corrected detected values of the $CO_2$ sensors (13)

Advantages of the Invention

According to the first aspect of this disclosure, the number of the ventilation devices operating is controlled such that the detected values of $CO_2$ sensors (13) are lower than the reference value in all of ventilation devices (10) during operation, i.e., the maximum value among the detected values is lower than the reference value. Therefore, in the case, for example, where the maximum value among the detected values of $CO_2$ sensors (13) exceeds the reference value during operation of two of the ventilation devices (10), the number of the ventilation devices operating is increased, while the maximum value among the detected values is lower than the reference value, the operation is continued with the two ventilation devices. Therefore, there is no unnecessary increase in the number of ventilation devices (10) operating, enabling low power consumption. Furthermore, the number of the ventilation devices operating can be unchanged, which may lead to suppression of unnecessary start-stops due to hunting of control. Moreover, according to the first aspect of the present disclosure, the generation of a region of a target space (2) where the $CO_2$ concentration is high is suppressed, resulting in substantial prevention of the problem of uncomfortable feelings of people who stay in the area with high $CO_2$ concentration.

According to the second aspect of the present disclosure, in the case of increase in the number of ventilation devices (10) operating, the above ventilation device (5) starts the ventilation device (10) which is located near the region of the target space (2) where $CO_2$ concentration is high. Accordingly, $CO_2$ existing in the region of the target space (2) where $CO_2$ concentration is high can be discharged to outside, so that the $CO_2$ concentration can be lower than the reference value with the minimum number of the ventilation devices operating.

According to the third aspect of the present disclosure, in the case where the control is performed to increase the number of the above ventilation devices (10) operating, the number is increased one by one, while in the case where the control is performed to decrease the number of the above ventilation devices (10) operating, the number is decreased in a manner in which the number is decreased by half or almost by half. In this way, unnecessary increase in the number of the ventilation devices operating can be avoided and the number of the ventilation devices operating can be decreased by half (or almost by half), resulting in faster control compared with the case where the number of the ventilation devices operating is decreased one by one.

According to the fourth aspect of the present disclosure, in the case where the situation remains unchanged with one ventilation device (10) operating, the $CO_2$ concentration is lower than the reference value even with one device operating. Accordingly, the volume of air of a fan (12) is controlled to be minimum, thereby further enhancing the effect of low electricity consumption.

According to the fifth aspect of the present disclosure, in the case where the number of the ventilation devices (10) operating is maximum, the maximum value of the $CO_2$ concentration exceeds the reference value. Accordingly, the volumes of air of fans (12) provided in each of the ventilation devices (10) are controlled to be maximum so that the discharged air volumes increase, thereby increasing comfort in the target space (2).

According to the sixth aspect of the present disclosure, at the time of start-up of the ventilation system, the air ventilation commences with a region of the target space (2) with the highest $CO_2$ concentration. Accordingly, compared with the case in which the ventilation device (10) in a region where the $CO_2$ concentration is lower is started as first, the possibility would become high that the detected values of all the $CO_2$ sensors (13) are lower than the reference value if only one of the ventilation devices (10) should be started. Therefore, at the time of start-up of the system, effective control can be performed.

According to the seventh aspect of the present disclosure, the number of the ventilation devices (10) operating is controlled in accordance with the corrected detected values of the $CO_2$ sensors (13), so that more accurate control can be performed.

BRIEF DESCRIPTION OF THE DRAWINGS

FIG. 4 is a table showing the target number of devices operating and the control standard of the volume of air set by the ventilation system of FIG. 1.

FIG. 5 is a table illustrating the change of the threshold value of the $CO_2$ concentration shown in FIG. 4.

DESCRIPTION OF EMBODIMENTS

In the following, embodiments will be described in detail with reference to the drawings.

Figure 1:
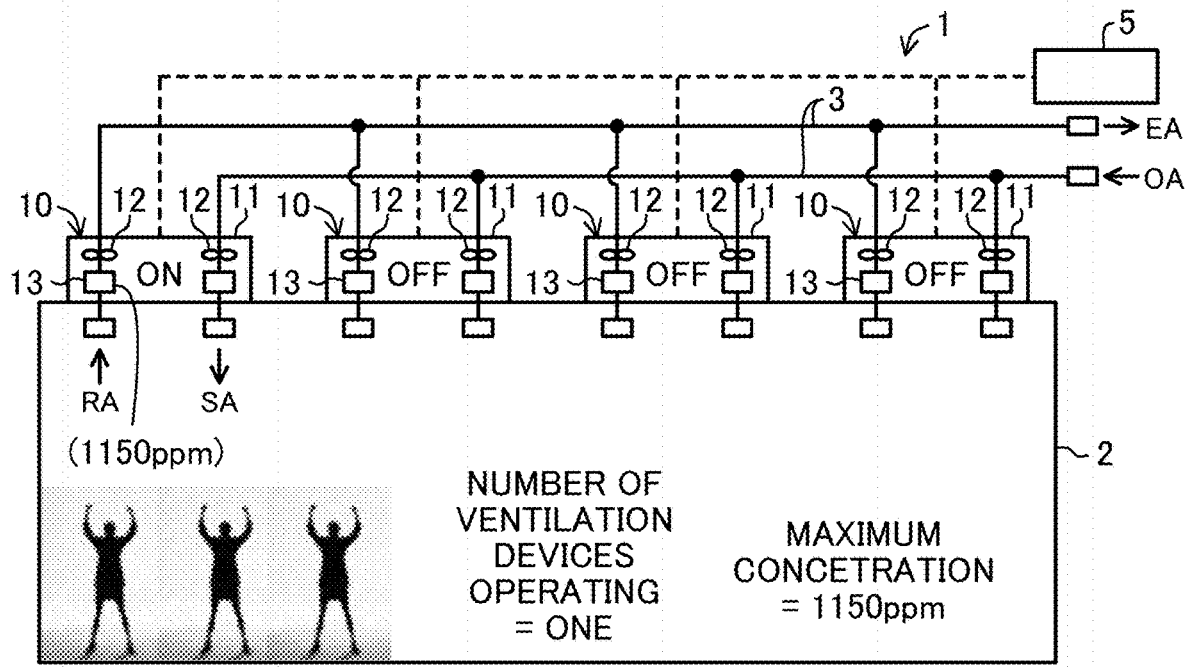
FIG. 1 is a diagram showing a configuration of a ventilation system and a first operating state of an embodiment.

FIG. 1 illustrates a configuration of the ventilation system (1). As shown in FIG. 1, in this ventilation system (1), a plurality of ventilation devices (10) (four in FIG. 1) are installed in one room (2) which is a target space. Though not shown, the ventilation devices (10) each include two heat exchangers (adsorption heat exchangers) carrying an adsorption material and housed in a casing (11). The casing (11) also houses a refrigerant circuit connected with those adsorption heat exchangers.

The refrigerant circuit is configured such that the circulation direction of refrigerant can be reversed. The refrigerant circuit can be alternately switched between a first refrigeration cycle where one of the adsorption heat exchangers serves as an evaporator and the other serves as a condenser and a second refrigeration cycle where the one of the adsorption heat exchangers turns into a condenser and the other turns into the evaporator.

An air passage is formed in each of the casings (11) and provided with a fan (12). Each of the casings (11) is connected to a duct (3). The above air passages are configured to take in outdoor air (OA) and guide it into the room as supply air (SA), and to take in indoor air (room air) (RA) and discharge it to outside as exhaust air (EA). The air passages are configured such that the air flows can be switched between an airflow for the dehumidifying operation where air (SA) supplied into the room (2) always passes through the evaporator and an airflow for the humidifying operation where air (SA) supplied into the room (2) always passes through the condenser.

In the dehumidifying operation, the circulation direction of the refrigerant in the refrigerant circuit is reversed at predetermined time intervals (for example, every 3 minutes). In accordance therewith, the air passages are configured such that supply air (SA) guided from outside into the room always passes through the adsorption heat exchanger serving as the evaporator among the adsorption heat exchangers alternately switched between the evaporator and condenser In the humidifying operation, the circulation direction of the refrigerant in the refrigerant circuit is reversed. In accordance therewith, the air passages are configured such that supply air (SA) guided from outside into the room always passes through the adsorption heat exchanger serving as the condenser among the adsorption heat exchangers alternately switched between the evaporator and condenser.

Each of the ventilation devices (10) includes, on a passage through which indoor air (room air) is discharged to outside, a $CO_2$ sensor (13) detecting the $CO_2$ concentration in air.

Further, the ventilation system (1) includes a controller (control device) (5) controlling the operation of each of the ventilation devices (10). This controller controls the number of the ventilation devices operating so that for all the ventilation devices (10) operating, the detected values of the $CO_2$ sensors (13) are lower than the reference value. That is, the above controller (5) performs control to decrease the $CO_2$ concentration through increase in the number of the ventilation devices operating if any one of the detected values of the $CO_2$ sensors (13) of the ventilation devices (10) exceeds the reference value. This control enables the maximum value of the $CO_2$ concentration detected by each of the ventilation devices (10) not to exceed the reference value in the ventilation system (1) of this embodiment.

The above controller (5) is configured such that if the maximum value of the $CO_2$ concentration exceeds the reference value and the control of increase in the number of the ventilation devices (10) operating is to be performed, the ventilation device (10) closest to the ventilation device (10) with the maximum detected value of $CO_2$ concentration would be started.

The above controller (5) is configured as follows: In the case of control for increasing the number of ventilation devices (10) because the maximum value of $CO_2$ concentration is higher than the reference value, the controller (5) increases the number of the ventilation devices operating one by one. On the other hand, in the case of control for decreasing the number of ventilation devices (10) because the maximum value of $CO_2$ concentration is lower than the reference value, the controller (5) decreases the number by half if the total number of ventilation devices (10) is even, and decreases almost by half (the decimal number should be rounded up) if the total number of ventilation devices is odd.

Further, in the case where one ventilation device (10) is operated, the above controller (5) controls to set the volume of air of the fan (12) provided in the ventilation device (10) to minimum. Furthermore, in the case where the number of ventilation devices (10) is maximum, the above controller (5) controls the volume of air of each of the fans (12) provided in the corresponding one of the ventilation devices (10) to maximum.

Moreover, if starting any one of the ventilation devices (10) after all the ventilation devices (10) of this ventilation system (1) have been stopped, the above controller (5) is configured to first start the ventilation device (10) including the $CO_2$ sensor (13) indicating the maximum detected value among all the $CO_2$ sensors (13). That is, in the case of start-up of the ventilation system (1), the ventilation starts with a region of the room (2) where the $CO_2$ concentration is higher.

—Detailed Control—

In this embodiment, the above controller (5) is configured to perform detailed controls based on the tables shown in FIG. 4 and FIG. 5.

<Control of the Number of the Ventilation Devices Operating>

The number of the ventilation devices operating is controlled in accordance with the threshold values of the $CO_2$ concentration shown in FIG. 4. Specifically, the $CO_2$ concentration of each of the $CO_2$ sensors (13) and the number of ventilations devices (10) operating are determined at predetermined time intervals (for example, every 15 minutes). Then, the number of the ventilation devices operating is controlled in accordance with the conditions stated in the column of the target number of the ventilation devices operating of FIG. 4. In this connection, it is noted that the detected values of $CO_2$ sensors (13) are not determined during 30 minutes since the first switch-on of the power supply, because warming-up is performed in this time period. After detecting the $CO_2$ concentrations from the $CO_2$ sensors (13) of the ventilation devices (10) operating, the detected maximum value of the $CO_2$ concentration is used for the control in this embodiment.

For example, if the maximum value of the $CO_2$ concentration of the ventilation devices (10) is lower than 1000 ppm, which is the reference value (base concentration), and equal to or higher than 725 ppm, the current number of the ventilation devices operating is considered as the target number of the ventilation devices operating, that is, there is no change in the number. If the maximum value of $CO_2$ concentration is equal to or higher than 1000 ppm and lower than 1200 ppm, the target number of the ventilation devices operating is obtained from adding the current number of the ventilation devices operating with one. In this connection, it is noted that the ventilation device (10) which is closest to the ventilation device (10) with the maximum value of $CO_2$ concentration is operated. If the maximum value of $CO_2$ concentration is equal to or higher than 1200 ppm, the target number of the ventilation devices operating is the full number of the ventilation devices (10) for which the number control ($CO_2$ gang control) is performed in this embodiment.

If the maximum value of $CO_2$ concentration is equal to or higher than 500 ppm and lower than 725 ppm, the target number of the ventilation devices operating is decreased by half, that is, the current number of the ventilation devices operating is reduced to half. In this case, if the calculated value contains a decimal number, the decimal number would be rounded up to the nearest whole number, which is then considered as the target number of the ventilation devices operating. As a result, the number of the ventilation devices operating is reduced almost by half. If the maximum value of the $CO_2$ concentration is lower than 500 ppm, the target number of the ventilation devices operating would be one.

Moreover, if any one of the ventilation devices (10) is started after all the ventilation devices (10) of this ventilation system (1) have been stopped, the ventilation device (10) is started at first, which includes the $CO_2$ sensor (13) with the maximum detected value of $CO_2$ concentration among all the detected values of the $CO_2$ sensors (13). In other words, in the case of start-up of the ventilation system (1), the ventilation commences with a region of the room (2) where the $CO_2$ concentration is higher.

<Air Volume Control>

On the installation site of the ventilation system (1), for the ventilation device (10) having the setting of constant volume of air of "yes", the air volume control is performed in accordance with the $CO_2$ concentration, while for the ventilation device (10) having the setting of constant volume of air of "no", no air volume control is performed. In the following, the control of the ventilation devices (10) for which the air volume control is performed is described in detail.

In the air volume control of this embodiment, if the maximum value of $CO_2$ concentration is equal to or higher than 500 ppm and lower than 1300 ppm, the on-site setting of the volume of air set for each of the ventilation devices (10) is used. If the maximum value of the $CO_2$ concentration is lower than 500 ppm and the number of the ventilation devices operating is one, the volume of air set is controlled to be the minimum volume of air set by L tap. If the maximum value of the $CO_2$ concentration is equal to or higher than 1300 ppm and all the ventilation devices are operated, the volume of air set is controlled to be the maximum volume of air set by H tap for all the ventilation devices.

<Reference Value of $CO_2$ Concentration (Base Concentration)>

The reference value of the $CO_2$ concentration can be changed from 1000 ppm, as illustrated in FIG. 5.

In FIG. 5, if the setting position of the setting switch is made to "01", the reference value of the $CO_2$ concentration remains 1000 ppm, which is "no shift". If the setting position is made to from "02" to "07", the respective values described in the table of FIG. 5 are added to or decreased from the reference value. In this case, the respective threshold values of the $CO_2$ concentration in the table of FIG. 4 are also changed by the same values.

—Operation—

In the following, the operation of the ventilation system (1) is described.

In this embodiment, the number of the ventilation devices operating is controlled so that the detected values of the $CO_2$ sensors (13) of all the ventilation devices (10) operating are lower than the reference value, i.e., the maximum value among the detected values is lower than the reference value. For example in FIG. 1, if the detected value of the $CO_2$ sensor (13) exceeds the reference value when one of the ventilation devices (10) operating, the number of the ventilation devices operating is increased. Then, when the maximum value among the detected values of all the $CO_2$ sensors (13) falls below the reference value, the operation continues with the current number of the ventilation devices operating.

In FIG. 1, the room (2) is divided into a region with people and a region without people, resulting in non-uniform $CO_2$ concentration through the entire room (2). Accordingly, in the case of FIG. 1, the ventilation device (10) dealing with a space with higher $CO_2$ concentration because of existence of people in the room (2) is started. $CO_2$ is discharged mainly from this region of the space.

Figure 2:
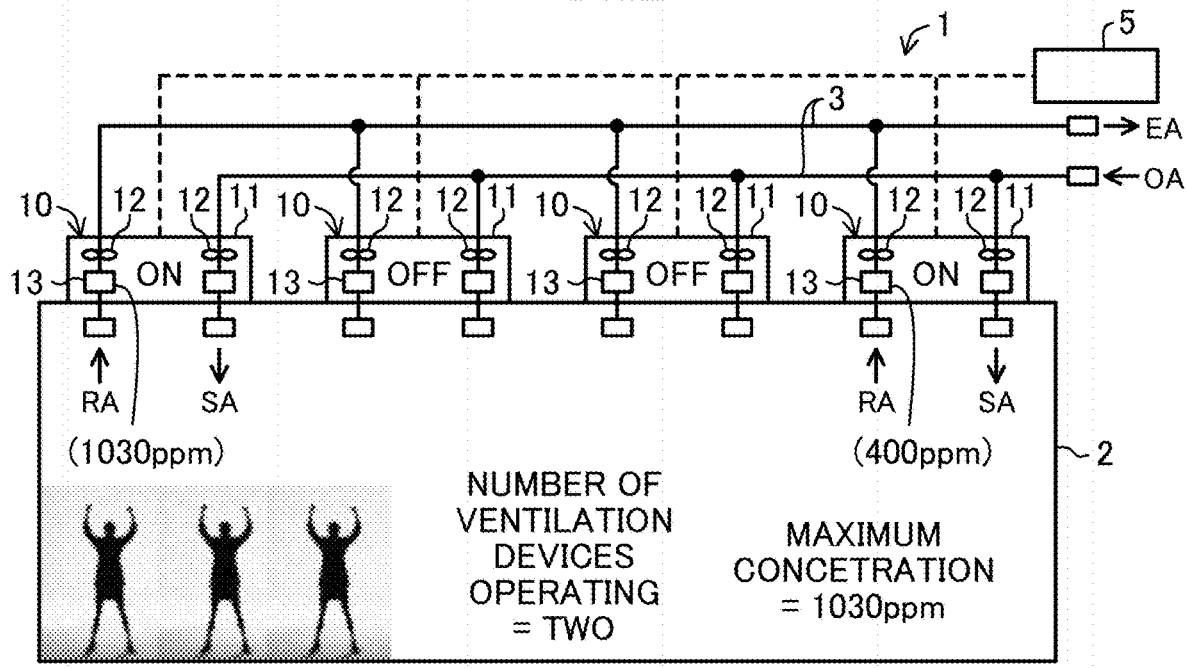
FIG. 2 is a diagram showing a second operating state of the ventilation system of FIG. 1.
Figure 3:
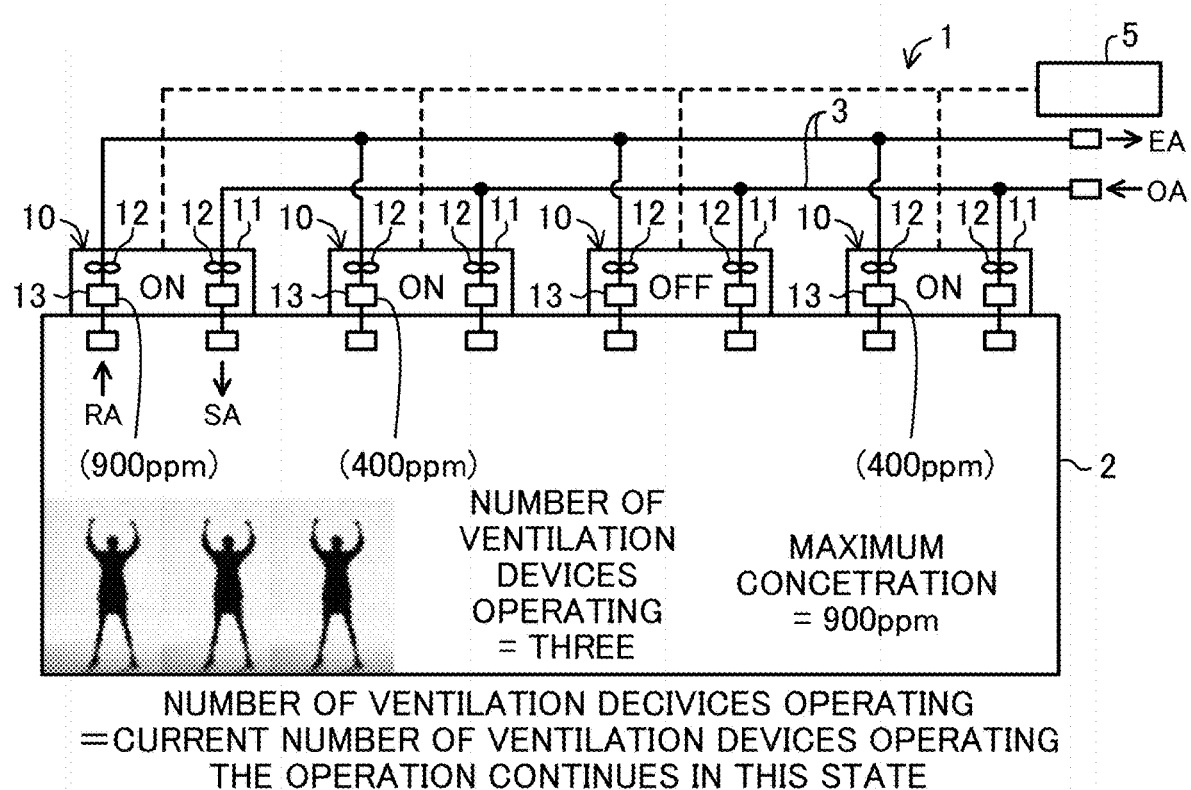
FIG. 3 is a diagram showing a third operating state of the ventilation system of FIG. 1.

FIG. 2 shows the state in which the control of increase in the number of ventilation devices (10) operating from the state shown in FIG. 1. In FIG. 2, as an example, the ventilation device (10) far from the ventilation device (10) which was operated in FIG. 1 is started. In this case, the maximum value among the detected values of the $CO_2$ sensors (13) still exceeds the reference value. Therefore, in FIG. 3, one more ventilation device (10) is started. In this case, the maximum value among the detected values of the $CO_2$ sensors (13) is lower than the reference value. In this state, the number of the ventilation devices operating is not further increased, so that the operation continues in this state.

Note that in FIG. 2, the ventilation device (10) far from a region with higher $CO_2$ concentration is started, so that the maximum value among the detected values of $CO_2$ concentration does not fall within the range of the reference value. Therefore, in the case of control of increase in the number of the ventilation devices (10) operating, it is preferable under consideration of the non-uniformity in $CO_2$ concentration to start the ventilation device (10) which is the closest to the ventilation device (10) with the maximum detected value of $CO_2$ concentration. That is, in the case of increase in the number of the ventilation devices (10) operating, the ventilation device (10) which is the closest to a region of the room (2) as a target space where the $CO_2$ concentration is higher is started. In this way, mainly $CO_2$ in the region with higher $CO_2$ concentration is discharged to outside. Therefore, in some cases, the maximum value among the detected values of $CO_2$ concentration can be lower than the reference value with the smaller number of the ventilation devices operating.

In the case of control of increase in the number of the ventilation devices (10) operating, the number of the ventilation devices operating is increased one by one and the $CO_2$ concentration of each of the ventilation devices (10) is checked. On the other hand, in the case of control of decrease in the number of the ventilation devices operating, the number of the ventilation devices operating is decreased by half (or almost by half) and the $CO_2$ concentration of each of the ventilation devices (10) is checked.

On the contrary, in the case where the situation remains unchanged with one ventilation device (10) operating, the $CO_2$ concentration is lower than the reference value even with one ventilation device operating. Accordingly, the volume of air of a fan (12) is controlled to be minimum, thereby further enhancing the effect of low electricity consumption. On the contrary, if the number of the ventilation devices (10) is maximum, the maximum value of the $CO_2$ concentration may have already exceeded the reference value. Therefore, the volumes of air of all the fans (12) provided in the respective ventilations devices (10) are maximized to increase the volume of air discharged.

Further, in this embodiment, at the time of start of the ventilation system (1), the ventilation device (10) to be started at first is predetermined so as to ventilate air starting with a region in the room (2) with the highest $CO_2$ concentration. Therefore, compared with the case of start of the ventilation device (10) in a region with low $CO_2$ concentration, the possibility becomes high that the detected values of all the $CO_2$ sensors (13) are lower than the reference value through starting only one ventilation device (10). Therefore, at the time of start-up of the system, effective control can be performed.

In case of control using the $CO_2$ sensors (13), the detected values of the $CO_2$ sensors (13) themselves may vary from each other. In view of this, the variation in the detected values of the $CO_2$ sensors (13) is preferably corrected. For this purpose, in this embodiment, in the supposed case where there are no people in the room (2) (in the case when the remote controller is switched off), the fans (12) of all the ventilation devices (10) are operated in a given time (for example, 30 minutes), and then the average value of the $CO_2$ concentration is calculated. Then the difference between the average value of $CO_2$ concentration thus calculated, which serves as a reference, and the detected value of each of the $CO_2$ sensors (13) is obtained as an error (correction factor). The detected value of each of the $CO_2$ sensors (13) is corrected through using this correction factor, thereby controlling the number of the ventilation devices (10) operated. In this way, more precise control is possible.

Advantages of Embodiment

According to this embodiment, the number of the ventilation devices (10) operating is controlled so that the detected values of the $CO_2$ sensors (13) of all the ventilation devices (10) operating are lower than the reference value (i.e., the maximum value among the detected values of the $CO_2$ sensors (13) is lower than the reference value). Accordingly, in the case where the number of the ventilation devices (10) operating is two, the number is increased if the maximum value among the detected values of the $CO_2$ sensors (13) exceeds the reference value, while the operation continues with the two ventilation devices operating if the maximum value among the detected values of the $CO_2$ sensors is lower than the reference value. Therefore, according to this embodiment, it is unnecessary to increase the number of the ventilation devices (10) operating more than required, enabling low power consumption. Furthermore, the number of the ventilation devices operating can be unchanged, which may lead to suppression of unnecessary start-stops due to hunting.

Further, according to this embodiment, in the case of increase in the number of the ventilation devices (10) operating, the controller (5) starts the ventilation device existing closest to a region of the room (2) as a target space with higher $CO_2$ concentration. Accordingly, $CO_2$ existing in the region of the room (2) as a target space with higher $CO_2$ concentration can be mainly discharged to outside, so that the $CO_2$ concentration can be lower than the reference value with the minimum number of the ventilation devices operating.

According to the this embodiment, in the case where the control is performed to increase the number of the above ventilation devices (10), the number is increased one by one, while in the case where the control is performed to decrease the number of the above ventilation devices (10), the number is decreased in a manner in which the number is decreased by half or almost by half. This makes it possible to avoid unnecessary increase in the number of the ventilation devices operating. Further, the number of the ventilation devices operating can be decreased by half (or almost by half), resulting in faster control than in the case where the number of the ventilation devices operating is decreased one by one.

According to this embodiment, in the case where the situation remains unchanged with one of the ventilation devices (10) operating, the $CO_2$ concentration is lower than the reference value even though the number of ventilation devices operating is one. Accordingly, the volume of air of a fan (12) is controlled to be minimum, thereby further enhancing the effect of low electricity consumption. Further, in the case where the number of the ventilation devices operating is maximum, the maximum value of the $CO_2$ concentration exceeds the reference value even in this state. Accordingly, the volumes of air of fans (12) provided in all the ventilation devices (10) are controlled to be maximum so that the volumes of air to be discharged increase, thereby increasing comfort in the target space.

Further, according to this embodiment, the ventilation device (10) which is first operated at the time of starting the system is the ventilation device having the $CO_2$ sensor (13) with the highest value among the detected values of the $CO_2$ concentration, thereby enabling efficient start-up control.

According to this embodiment, the generation of a region of the room (2) where the $CO_2$ concentration is higher can be avoided, resulting in substantial prevention of the problematic uncomfortable feelings of people who stay in the area with higher $CO_2$ concentration. Further, according to this embodiment, hunting is suppressed while the number of the ventilation devices operating is increased or decreased. Hence, it is also possible to suppress the occurrence of unnecessary start-stops of the ventilation device (10).

According to this embodiment, the detected values of the $CO_2$ sensors (13) are corrected. Based on the corrected value thus obtained, the number of the ventilation devices (10) operating is controlled, thereby making it possible to precisely control the multiple ventilation devices (10).

Other Embodiments

The above-described embodiment may be modified as follows.

According to the above embodiment, the ventilation device (10) is described as the device having two adsorption heat exchangers connected to the refrigerant circuit. However, the configuration of the ventilation device (10) is not limited to this embodiment. Other configurations are possible. For example, a configuration with a total heat exchanger may be employed.

Further, the number of the ventilation devices (10) to be provided in one room (2) may be appropriately changed.

Moreover, according to the above embodiment, in the case of increase in the number of the ventilation devices (10) in accordance with the maximum value of $CO_2$ concentration, the ventilation device (10) closest to the ventilation device (10) with the maximum $CO_2$ concentration is started. The present invention is not necessarily limited to this control. Other ventilation devices (10) may be started.

Also, the control of increase or decrease in the number of the ventilation devices operating is not limited to the control of the above embodiment. Further, the control of the fan in the case of the minimum or the maximum number of the ventilation devices operating is not limited to the control of the above embodiment.

At the time of the start-up of the system, the ventilation device (10) with the maximum value of $CO_2$ concentration may not be necessarily first started. Other controls are also possible. For example, the ventilation device (10) with the shortest total operation hours so far may be first started.

In short, the ventilation system (1) of this disclosure may be appropriately changed as far as the system includes a control device (5) controlling the number of the ventilation devices operating so that the detected values of the $CO_2$ sensors (13) of all the ventilation devices (10) operated are lower than the reference value, i.e., the maximum value of the $CO_2$ concentration.

Note that the foregoing description of the embodiments is a merely preferred example in nature, and is not intended to limit the scope, application, or uses of the present disclosure.

INDUSTRIAL APPLICABILITY

As described above, this disclosure is useful for the ventilation system including a plurality of ventilation devices with $CO_2$ sensors detecting $CO_2$ concentration.

DESCRIPTION OF REFERENCE CHARACTERS

1 Ventilation System
2. Room (Target Space)
5. Controller (Control Device)
10. Ventilation Device
12. Fan
13. $CO_2$ Sensor

The invention claimed is:

1. A ventilation system comprising:
   a plurality of ventilation devices in a target space, the target space being one room, each of the ventilation devices including a fan, a carbon dioxide sensor, and at least one heat exchanger arranged so as to perform an operation of supplying air from an outdoor space into the target space or exhausting air from the target space into the outdoor space;
   a controller configured to control, for all the ventilation devices operating, the number of the ventilation devices operating so that a detected value of the carbon dioxide sensor is less than a reference value,
   wherein
      the controller controls the number of the ventilation devices depending on a plurality of thresholds of a carbon dioxide concentration, and the plurality of thresholds includes the reference value and first and second thresholds,
      the controller does not change the number of the ventilation devices if a maximum value among detected values of the carbon dioxide concentration is lower than the reference value and higher than the first threshold,
      the controller increases the number of the ventilation devices if the maximum value among the detected values of the carbon dioxide concentration exceeds the reference value, and
      the controller reduces the number of the ventilation devices by half, rounded to a whole number, if the maximum value among the detected values of the carbon dioxide concentration is higher than the second threshold and lower than the first threshold.

2. The ventilation system of claim 1, wherein
   in a case that the control performed increases in the number of the ventilation devices operating, the controller starts a ventilation device, among the ventilation devices, closest to a ventilation device, among the ventilation devices, with the maximum detected value of carbon dioxide.

3. The ventilation system of claim 1, wherein
   the controller increases the number of the ventilation devices operating one by one in a case that the control performed increases the number of the ventilation devices operating and decreases the number of the ventilation devices operating by half in a case that the control performed decreases the number of the ventilation devices operating.

4. The ventilation system of claim 1, wherein
   in a case where one of the ventilation devices is operated, the controller sets a volume of air of a fan provided in the one ventilation device to minimum.

5. The ventilation system of claim 1, wherein
   in a case where the number of the ventilation devices operating becomes maximum, the controller sets volumes of air of all fans provided in the respective ventilation devices to maximum.

6. The ventilation system of claim 1, wherein
   in a case where any one of the ventilation devices stopped is started, the controller starts at first a ventilation device, among the ventilation devices, with a carbon dioxide sensor showing maximum detected values among all the carbon dioxide sensors.

7. The ventilation system of claim 1, wherein
the controller is configured such that a difference between an average value of the detected values of the carbon dioxide sensors in a state where the number of the ventilation devices operating is maximum and each of the detected values of the respective carbon dioxide sensors is used as a correction factor for correction of the detected values, and that the number of the ventilation devices to be operating is determined based on the correction factor.

8. The ventilation system of claim 2, wherein
the controller increases the number of the ventilation devices operating one by one in a case that the control performed increases the number of the ventilation devices operating and decreases the number of the ventilation devices operating by half in a case that the control performed decreases the number of the ventilation devices operating.

9. The ventilation system of claim 2, wherein
in a case where one of the ventilation devices is operated, the controller sets a volume of air of a fan provided in the one ventilation device to minimum.

10. The ventilation system of claim 2, wherein
in a case where the number of the ventilation devices operating becomes maximum, the controller sets volumes of air of all fans provided in the respective ventilation devices to maximum.

11. The ventilation system of claims 2, wherein
in a case where any one of the ventilation devices stopped is started, the controller starts at first a ventilation device, among the ventilation devices, with a carbon dioxide sensor showing maximum detected values among all the carbon dioxide sensors.

12. The ventilation system of claim 2, wherein
the controller is configured such that a difference between an average value of the detected values of the carbon dioxide sensors in a state where the number of the ventilation devices operating is maximum and each of the detected values of the respective carbon dioxide sensors is used as a correction factor for correction of the detected values, and that the number of the ventilation devices to be operating is determined based on the correction factor.

13. The ventilation system of claim 1, wherein each of the ventilation devices include two adsorption heat exchangers.

14. The ventilation system of claim 1, wherein each of the ventilation devices includes a total heat exchanger.

* * * * *